(12) United States Patent
Ito

(10) Patent No.: US 8,654,443 B2
(45) Date of Patent: Feb. 18, 2014

(54) IMAGE DISPLAY APPARATUS

(75) Inventor: Hiroshi Ito, Hakusan (JP)

(73) Assignee: Eizo Nanao Corporation, Ishikawa (JP)

(*) Notice: Subject to any disclaimer, the term of this patent is extended or adjusted under 35 U.S.C. 154(b) by 153 days.

(21) Appl. No.: 13/143,457

(22) PCT Filed: Nov. 25, 2009

(86) PCT No.: PCT/JP2009/006357
§ 371 (c)(1),
(2), (4) Date: Jul. 6, 2011

(87) PCT Pub. No.: WO2010/082262
PCT Pub. Date: Jul. 22, 2010

(65) Prior Publication Data
US 2011/0267689 A1    Nov. 3, 2011

(30) Foreign Application Priority Data
Jan. 16, 2009   (JP) .................... 2009-007443

(51) Int. Cl.
*G02B 27/22* (2006.01)
(52) U.S. Cl.
USPC ..................................... 359/462
(58) Field of Classification Search
USPC .......... 359/462, 475, 477; 362/608, 609, 615, 362/623, 625; 349/67; 348/53
See application file for complete search history.

(56) References Cited

U.S. PATENT DOCUMENTS

| | | | |
|---|---|---|---|
| 5,491,525 A * | 2/1996 | Yamasaki et al. | 353/98 |
| 6,559,825 B2 * | 5/2003 | Jacobsen et al. | 345/102 |
| 7,178,947 B2 * | 2/2007 | Marks | 362/298 |
| 2003/0218701 A1 | 11/2003 | Kawakami | |
| 2004/0179264 A1 * | 9/2004 | Agostinelli et al. | 359/464 |
| 2008/0211991 A1 * | 9/2008 | Wood | 349/67 |
| 2009/0086505 A1 * | 4/2009 | Iwasaki et al. | 362/612 |
| 2009/0237593 A1 | 9/2009 | Hoshi | |
| 2009/0303744 A1 | 12/2009 | Iwasaki | |

FOREIGN PATENT DOCUMENTS

| | | |
|---|---|---|
| EP | 1 001 298 A1 | 5/2000 |
| JP | 63-68815 A | 3/1988 |
| JP | 2000-147669 A | 5/2000 |
| JP | 2001-281655 A | 10/2001 |

(Continued)

OTHER PUBLICATIONS

Chien et al. Time-Multiplexed Three-Dimensional Displays Based on Directional Backlights with Fast-Switching Liquid-Crystal Displays, May 1, 2006, Applied Optics, vol. 45 pp. 3106-3110.*
International Search Report for the Application No. PCT/JP2009/006357 mailed Dec. 28, 2009.

*Primary Examiner* — Alessandro Amari
*Assistant Examiner* — Jie Lei
(74) *Attorney, Agent, or Firm* — Cheng Law Group, PLLC

(57) ABSTRACT

The stereoscopic image display apparatus of this invention includes an upper light source unit 29 having a pair of light sources 33 and 35 and a lower light source unit, which are arranged between a reflection unit 17 with an elliptical mirror 15 having one focus f1 on the side of a reflecting surface 19, and a transmission type liquid crystal display panel 5. Thus, the apparatus has a reduced width. Moreover, the elliptical mirror 15 is the stationary type, and the reflecting surface 19 employed is shaped symmetrical in plan view. This allows the respective light sources to use the common elliptical mirror 15. Therefore, the stereoscopic image display apparatus realizes a reduction in size and a reduction in apparatus cost.

18 Claims, 15 Drawing Sheets

(56) References Cited

FOREIGN PATENT DOCUMENTS

| JP | 2001281655 A | * | 10/2001 |
| JP | 2003-330021 A | | 11/2003 |
| JP | 2008-166160 A | | 7/2008 |
| JP | 2009-128878 A | | 6/2009 |
| WO | WO-2006/107105 A1 | | 10/2006 |

* cited by examiner

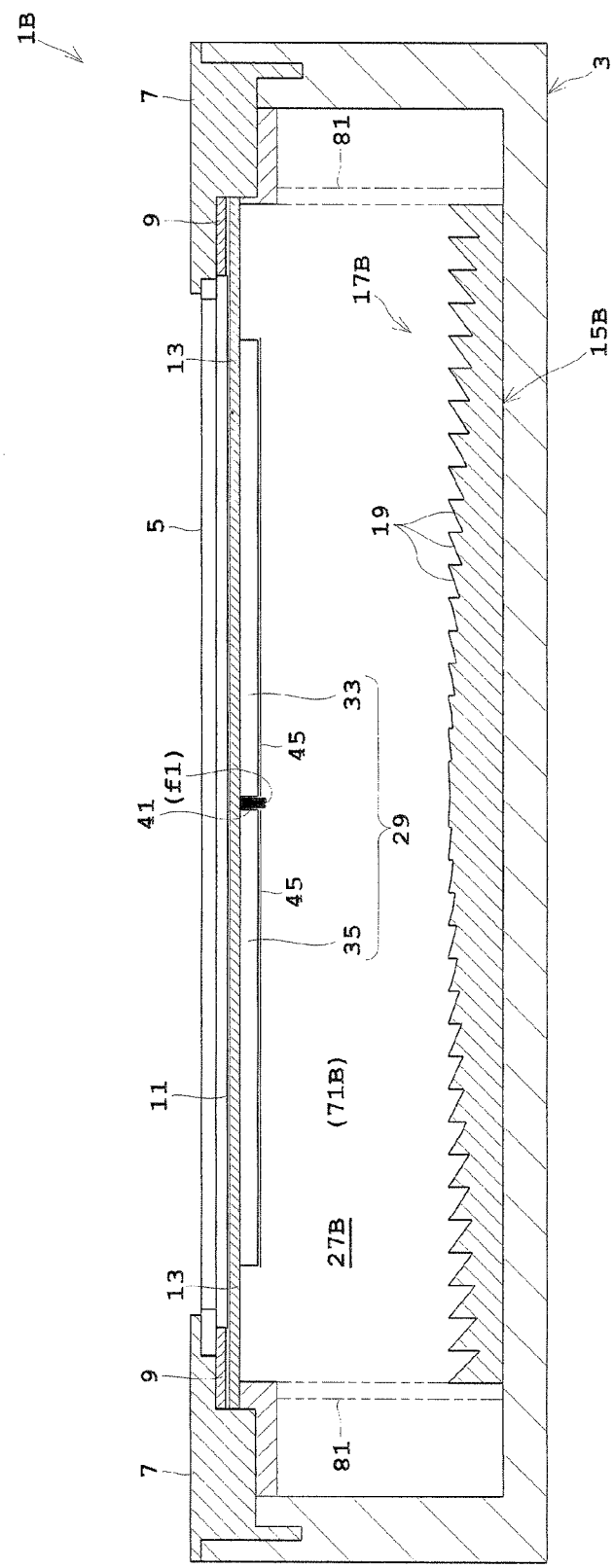

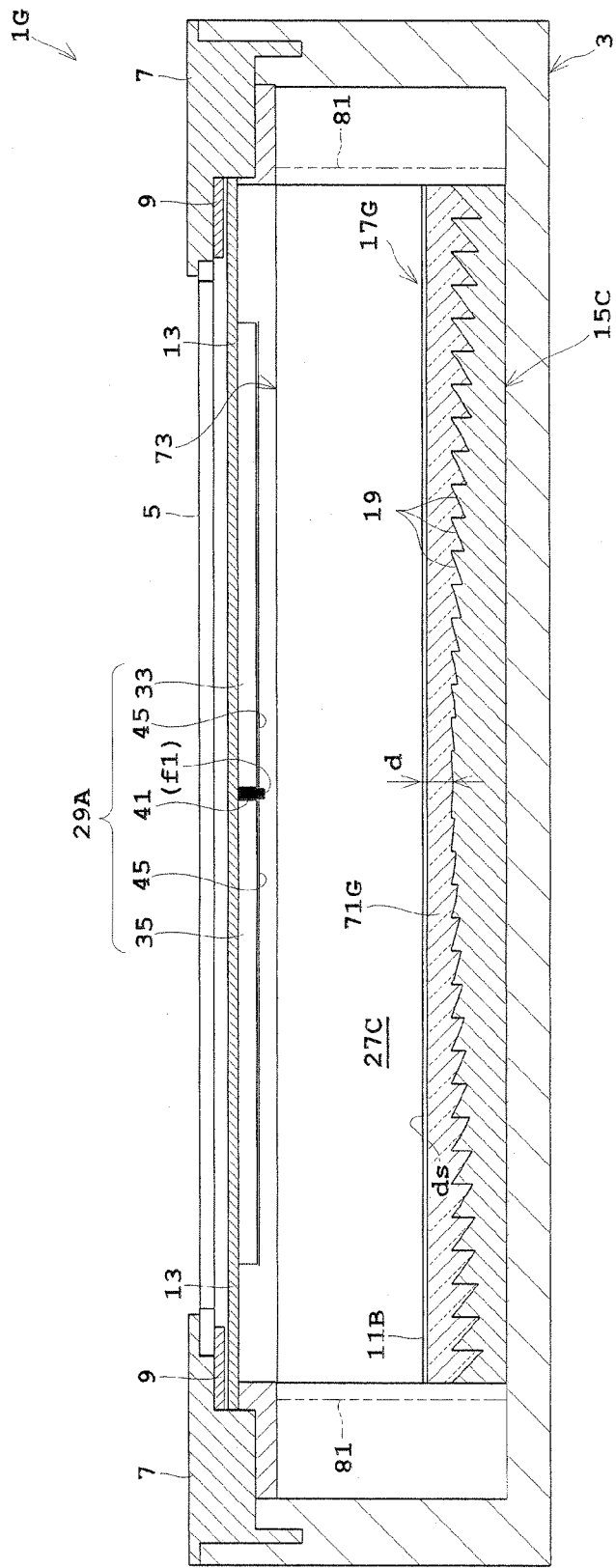

IMAGE DISPLAY APPARATUS

TECHNICAL FIELD

This invention relates to an image display apparatus for displaying images, and more particularly relates to a technique for displaying images by using an elliptical mirror.

BACKGROUND ART

Conventionally, an apparatus of this type includes a liquid crystal display panel for displaying images, a pair of light sources arranged at opposite sides of this liquid crystal display panel, and a movable Fresnel mirror disposed at the back side of the liquid crystal display panel (see Patent Document 1, for example). The apparatus having such construction distributes images to both, right and left eyes, for example, by alternately switching the reflecting direction of the movable Fresnel mirror as synchronized with an alternate display of an image for the right eye and an image for the left eye on the liquid crystal display panel. Consequently, the observer can see a stereoscopic image using binocular parallax.
[Patent Document 1]
Unexamined Patent Publication No. 2000-147669 (FIGS. 1-3)

DISCLOSURE OF THE INVENTION

Problem to be Solved by the Invention

However, the conventional example with such construction has the following problems.

In order to distribute images right and left, the conventional apparatus requires a mechanism for operating the movable Fresnel mirror. This gives rise to a problem of complicating the apparatus and increasing apparatus cost.

Then, in order to solve the above problem, Applicant herein has proposed an apparatus including a reflection unit constructed by alternately laminating, face to face, an elliptical mirror for the right eye and an elliptical mirror for the left eye which assume the shape of strips as seen from the exiting direction, and a light source for the right eye and a light source for the left eye arranged on right and left side surfaces of this reflection unit (see Patent Application No. 2007-307168).

This proposed apparatus can dispense with a movable portion, and can simplify the construction as compared with the above conventional technique, but has a problem that the entire apparatus becomes large in the lateral direction since it is necessary to arrange the light sources on the opposite, right and left side surfaces of the reflection unit. Especially since it is common practice that the liquid crystal display panel is laterally long (what is called the wide liquid crystal), the above proposed apparatus has a problem that the entire apparatus becomes extremely long in the lateral direction to enlarge its footprint. Since a plurality of elliptical mirrors are laminated, there are problems that the apparatus has an increased weight, and again the construction is complicated.

This invention has been made having regard to the state of the art noted above, and its object is to provide an image display apparatus which can realize a reduction in size and a reduction in apparatus cost by devising a reflection unit and light sources.

Means for Solving the Problem

To fulfill the above object, this invention provides the following construction.

The invention defined in claim 1 provides an image display apparatus for displaying images, comprising a transmission type display panel for displaying the images; a reflection unit disposed at a back side of the transmission type display panel, and including an elliptical mirror which corresponds to part of an arc of an ellipse and has a reflecting surface shaped symmetrical across a center line in plan view, one focus of the ellipse being adjacent the reflecting surface, and the other focus of the ellipse being set between both eyes of an observer; and a light source unit including a pair of light sources arranged adjacent the one focus of the reflection unit, attached adjacent the back side of the transmission type display panel in a position to emit light to the reflecting surface, and opposed to each other across the one focus of the reflection unit in plan view.

According to this invention, the width of the image display apparatus can be restrained since the light source unit having a pair of light sources is arranged between the reflection unit including the elliptical mirror having one of the focuses on the side of the reflecting surface and the other focus set between both eyes of an observer, and the transmission type display panel. Moreover, the elliptical mirror is the stationary type, and the reflecting surface employed is shaped symmetrical in plan view, which allow the respective light sources to use the common elliptical mirror. Therefore, a reduction in size and a reduction in apparatus cost can be achieved.

The invention defined in claim 2 provides an image display apparatus for displaying images, comprising a transmission type display panel for displaying the image; a reflection unit disposed at a back side of the transmission type display panel, and including an elliptical mirror which corresponds to part of an arc of an ellipse and has Fresnel type reflecting surfaces shaped symmetrical across a center line in plan view, one focus of the ellipse being adjacent the Fresnel type reflecting surfaces, and the other focus of the ellipse being set between both eyes of an observer; and a light source unit including a pair of light sources arranged adjacent the one focus of the reflection unit, attached adjacent the back side of the transmission type display panel in a position to emit light to the Fresnel type reflecting surfaces, and opposed to each other across the one focus of the reflection unit in plan view.

According to this invention, the width of the image display apparatus can be restrained since the light source unit having a pair of light sources is arranged between the reflection unit including the elliptical mirror having one of the focuses on the side of the Fresnel type reflecting surfaces and the other focus set between the two eyes of an observer, and the transmission type display panel. Moreover, the elliptical mirror is the stationary type, and the reflecting surface employed is shaped symmetrical in plan view, which allow the respective light sources to use the common elliptical mirror. Moreover, since the elliptical mirror has the Fresnel type reflecting surfaces, the reflection unit can be reduced in thickness. Therefore, a further reduction in size and a reduction in apparatus cost can be achieved.

In this invention, it is preferred that the light source unit includes an upper light source unit having an upper first light source and an upper second light source attached to an upper portion of the transmission type display panel; the apparatus further comprising an image output device for alternately outputting a first image and a second image to the transmission type display panel; and a light source control device for switching on the upper first light source when the first image is outputted, and switching on the upper second light source when the second image is outputted (claim 3). As the image output device switches between the first image and the second image for output, the light source control device switches lighting of the upper first light source and the upper second light source. This allows the upper light source unit alone to display the first image and the second image alternately while keeping down power consumption.

In this invention, it is preferred that the light source unit includes a lower light source unit having a lower first light source and a lower second light source attached to a lower portion of the transmission type display panel; the apparatus further comprising an image output device for alternately outputting a first image and a second image to the transmission type display panel; and a light source control device for switching on the lower first light source when the first image is outputted, and switching on the lower second light source when the second image is outputted (claim 4). As the image output device switches between the first image and the second image for output, the light source control device switches lighting of the lower first light source and the lower second light source. This allows the lower light source unit alone to display the first image and the second image alternately while keeping down power consumption.

In this invention, it is preferred that the light source unit includes an upper light source unit having an upper first light source and an upper second light source attached to an upper portion of the transmission type display panel, and a lower light source unit having a lower first light source and a lower second light source attached to a lower portion of the transmission type display panel; the apparatus further comprising an image output device for alternately outputting a first image and a second image to the transmission type display panel; and a light source control device for switching on the upper first light source and the lower first light source when the first image is outputted, and switching on the upper second light source and the lower second light source when the second image is outputted (claim 5). As the image output device switches between the first image and the second image for output, the light source control device switches lighting of the upper first light source and lower first light source, and the upper second light source and lower second light source. This allows the upper light source unit and lower light source unit to increase luminance of the first image and second image displayed on the transmission type display panel, thereby to facilitate appreciation of the images.

In this invention, it is preferred that the upper light source unit includes an upper light shielding member mounted between the upper first light source and the upper second light source (claim 6). With the upper light shielding member, the light emitted from either one of the upper first light source and upper second light source is inhibited from being emitted to the other one's side. Therefore, the first image and second image can be clearly displayed on the transmission type display panel.

In this invention, it is preferred that the lower light source unit includes a lower light shielding member mounted between the lower first light source and the lower second light source (claim 7). With the lower light shielding member, the light emitted from either one of the lower first light source and lower second light source is inhibited from being emitted to the other one's side. Therefore, the first image and second image can be clearly displayed on the transmission type display panel.

In this invention, it is preferred that the upper light source unit includes an upper light shielding member mounted between the upper first light source and the upper second light source, and the lower light source unit includes a lower light shielding member mounted between the lower first light source and the lower second light source (claim 8). With the upper light shielding member and lower light shielding member, the light emitted from either one of the upper first light source and upper second light source is inhibited from being emitted to the other one's side, and the light emitted from either one of the lower first light source and lower second light source is inhibited from being emitted to the other one's side. Therefore, the first image and second image can be clearly displayed on the transmission type display panel.

In this invention, it is preferred that the transmission type display panel includes a diffusing member attached to the back side thereof for vertically diffusing light (claim 9). Since the light reflected by the elliptical mirror of the reflection unit is vertically diffused, portions with different reflectances which may be produced in the lateral direction adjacent the upper and lower ends of the elliptical mirror can be inhibited from being displayed on the transmission type display panel.

In this invention, it is preferred that the light source unit includes a diffusing member mounted on a light output plane thereof for diffusing light (claim 10). Since the shape of the light emitted from the light source unit can be obscured, the shape of the light of the light source unit can be inhibited from appearing on the transmission type display panel.

In this invention, it is preferred that the reflection unit includes an upper reflector plate in form of a plate covering an area from the reflecting surface to a position corresponding to a chord of the arc, and a lower reflector is plate in form of a plate covering an area from the reflecting surface to the position corresponding to the chord of the arc (claim 11). This can make maximum use of the light of the light source unit emitted toward the reflection unit, and can increase the luminance of the images displayed on the transmission type display panel.

In this invention, it is preferred that the reflection unit includes an upper reflector plate in form of a plate covering an area from the Fresnel type reflecting surfaces to a position corresponding to a chord of the arc, and a lower reflector plate in form of a plate covering an area from the Fresnel type reflecting surfaces to the position corresponding to the chord of the arc (claim 12). This can make maximum use of the light of the light source unit emitted toward the reflection unit, and can increase the luminance of the images displayed on the transmission type display panel.

In this invention, it is preferred that the reflection unit includes a pair of side reflectors covering the area from the Fresnel type reflecting surfaces to the position corresponding to the chord of the arc (claim 13). This can make effective use also of the light which spreads sideways.

In this invention, it is preferred that the reflection unit includes a light guide forming a light passage space from the reflecting surface to a position corresponding to a chord of the arc (claim 14), and it is preferred that the reflection unit includes a light guide forming a light passage space from the Fresnel type reflecting surfaces to a position corresponding to a chord of the arc (claim 15). Since the reflecting surface or Fresnel type reflecting surfaces is/are covered with the light guide, degradation of the reflecting surface(s) with the passage of time can be prevented.

In this invention, it is preferred that the reflection unit includes a polarizing plate and a transparent plate laminated and formed in the stated order on a light output plane at a side corresponding to the chord (claim 16). Part of the light exiting from the light output plane is reflected by the back surface of the transmission type display panel to enter the light output plane again, thereby producing an unintended reflection at the reflecting surface. There is a possibility that this causes an aggravation of crosstalk. However, the light exiting from the light output plane is placed in a different polarized state by the polarizing plate. Therefore, even if it is reflected at the transmission type display panel or transparent plate, most is absorbed or attenuated by the polarizing plate. Therefore, the light traveling to the reflecting surface again can be reduced, and an aggravation of crosstalk can be prevented.

In this invention, it is preferred that the first image is an image for the right eye, and the second image is an image for the left eye, a binocular parallax being provided for the image for the right eye and the image for the left eye; and the upper first light source is disposed on a left side of the transmission type display panel as seen from the observer, and the upper second light source is disposed on a right side of the transmission type display panel as seen from the observer (claim 17). By alternately switching on the upper first light source and the upper second light source in accordance with images, the image for the right eye and the image for the left eye which have binocular parallax are alternately observed by the observer's right eye and left eye, thereby allowing the observer to recognize a stereoscopic image. Therefore, the image display apparatus which can display a stereoscopic image and which has achieved a reduction in size and a reduction in apparatus cost can be realized, while attaining power saving by employing only the upper light source unit.

In this invention, it is preferred that the first image is an image for the right eye, and the second image is an image for the left eye, a binocular parallax being provided for the image for the right eye and the image for the left eye; and the lower first light source is disposed on a left side of the transmission type display panel as seen from the observer, and the lower second light source is disposed on a right side of the transmission type display panel as seen from the observer (claim 18). By alternately switching on the lower first light source and the lower second light source in accordance with images, the image for the right eye and the image for the left eye which have binocular parallax are alternately observed by the observer's right eye and left eye, thereby allowing the observer to recognize a stereoscopic image. Therefore, the image display apparatus which can display a stereoscopic image and which has achieved a reduction in size and a reduction in apparatus cost can be realized, while attaining power saving by employing only the lower light source unit.

In this invention, it is preferred that the first image is an image for the right eye, and the second image is an image for the left eye, a binocular parallax being provided for the image for the right eye and the image for the left eye; and the upper first light source and the lower first light source are disposed on a left side of the transmission type display panel as seen from the observer, and the upper second light source and the lower second light source are disposed on a right side of the transmission type display panel as seen from the observer (claim 19). By alternately switching on the upper first light source and lower first light source and the upper second light source and lower second light source in accordance with images, the image for the right eye and the image for the left eye which have binocular parallax are alternately observed by the observer's right eye and left eye, thereby allowing the observer to recognize a stereoscopic image. Therefore, the image display apparatus which can display a stereoscopic image and which has achieved a reduction in size and a reduction in apparatus cost can be realized, while securing high luminance of the images by employing the upper light source unit and lower light source unit.

In this invention, it is preferred that the light source unit is attached in a tilted position with a light output plane thereof directed toward a middle part in a height direction of the reflecting surface (claim 20). The luminance of images can be increased since the light emitted from the light source unit can be directed to the elliptical mirror efficiently.

In this invention, it is preferred that the reflection unit includes a diffusing member adjacent the reflecting surface for vertically diffusing light (claim 21). After being diffused with the diffusing member, the light from the light source unit is reflected by the reflecting surface of the elliptical mirror, and then is again diffused with the diffusing member to travel to the transmission type display panel. Therefore, since diffusion can be produced efficiently, portions with different reflectances which may be produced in the lateral direction adjacent the upper and lower ends of the elliptical mirror can be further inhibited from being displayed on the transmission type display panel.

In this invention, it is preferred that the reflection unit includes a diffusing member adjacent the reflecting surface for vertically diffusing light, and a light guide disposed between the reflecting surface and the diffusing member (claim 22). Where a light guide is present between the diffusing member and the transmission type display panel and where the light guide and the diffusing member have an equal refractive index, there is a possibility that the diffusing action of the diffusing member will lower. However, there can be no lowering of the diffusing action in this invention since the light guide is provided only between the reflecting surface and the diffusing member. Since the light guide has a small capacity, a weight saving can be attained.

In this invention, it is preferred that the reflection unit includes a diffusing member adjacent the reflecting surface for vertically diffusing light, and a light guide disposed between the Fresnel type reflecting surfaces and the diffusing member (claim 23). Where a light guide is present between the diffusing member and the transmission type display panel and where the light guide and the diffusing member have an equal refractive index, there is a possibility that the diffusing action of the diffusing member will lower. However, there can be no lowering of the diffusing action in this invention since the light guide is provided only between the Fresnel type reflecting surfaces and the diffusing member. Since the light guide has a small capacity, a weight saving can be attained.

In this invention, it is preferred that the diffusing member of the reflection unit is spaced a predetermined distance from the reflecting surface (claim 24). Since a predetermined interval can be secured as diffusion distance for the light emitted from the light source unit, sufficient diffusion can be made during the time after the light transmits through the diffusing member until it arrives at the reflecting surface.

In this invention, it is preferred that the diffusing member has a diffusing surface on only one surface thereof, and is disposed to have the diffusing surface facing the transmission type display panel (claim 25). Since the rate at which the light from the light source unit undergoes surface reflection can be reduced, improvement can be made in use efficiency of the light from the light source unit. Even if the light emitted from the light source unit is reflected on the surface, the reflected light is diffused or attenuated over a wide range, and thus adverse influence of surface reflection is little.

Effects of the Invention

According to the image display apparatus of this invention, the width of the apparatus can be restrained since a light source unit having a pair of light sources is arranged between a reflection unit including an elliptical mirror having one of the focuses of the ellipse set on the side of a reflecting surface and the other focus set between both eyes of an observer, and a transmission type display panel. Moreover, the elliptical mirror is the stationary type, and the reflecting surface employed is shaped symmetrical in plan view, which allow the respective light sources to use the common elliptical mirror. Therefore, a reduction in size and a reduction in apparatus cost can be achieved.

BRIEF DESCRIPTION OF THE DRAWINGS

FIG. 9 is a cross section showing a second modification of the reflection unit;

FIG. 15 is a cross section showing a seventh modification.

Figure 1:
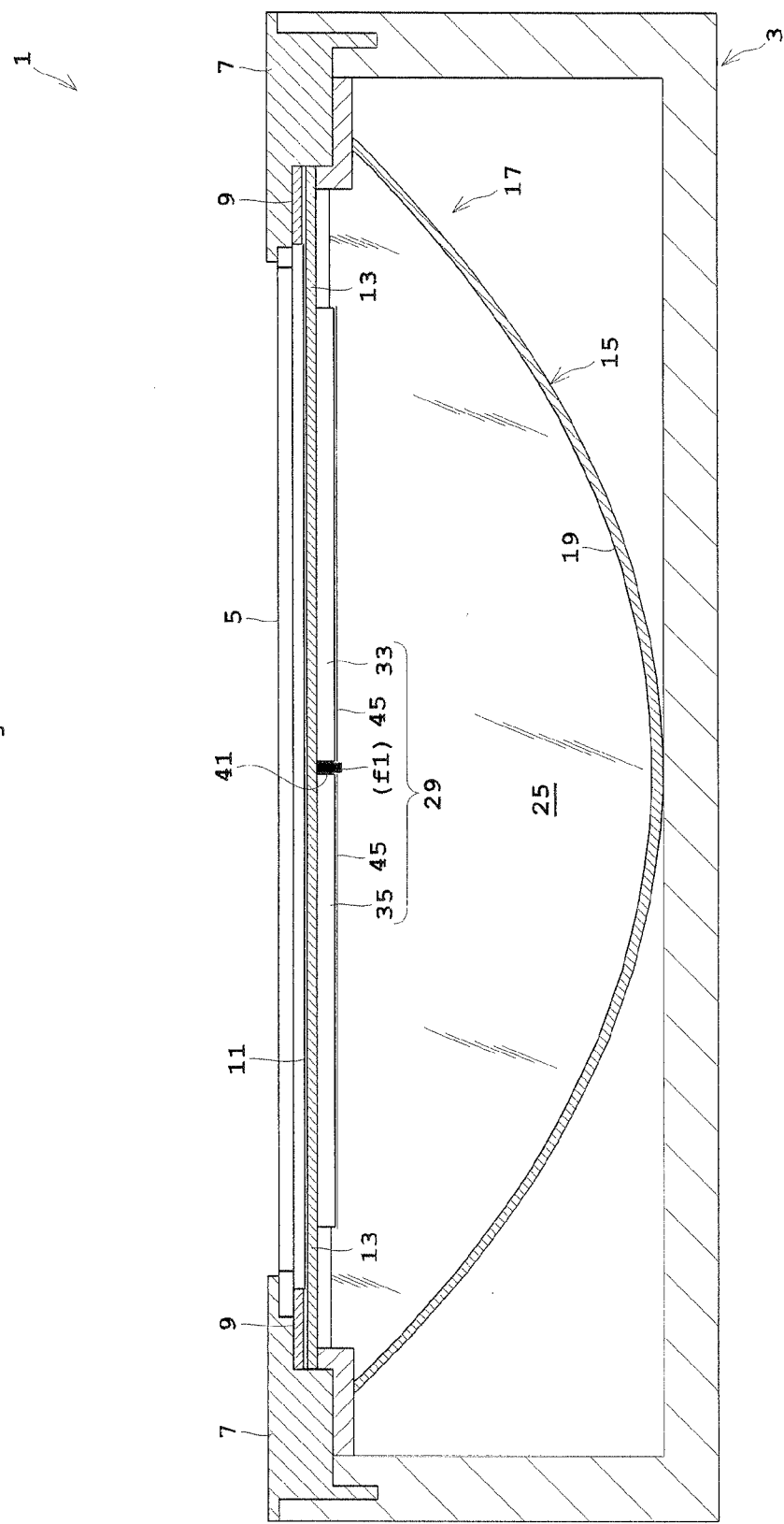
FIG. 1 is a cross section showing an outline construction of a stereoscopic image display apparatus according to an embodiment.

DESCRIPTION OF REFERENCES 1, 1A-1G . . . stereoscopic image display apparatus
3 . . . housing
5 . . . transmission type liquid crystal display panel
15, 15A-15C . . . elliptical mirrors
17, 17A-17G . . . reflection units
19 . . . reflecting surface
21 . . . ellipse
f1 . . . one focus
f2 . . . other focus
29, 29A . . . upper light source units
31, 31A . . . lower light source units
33, 37 . . . light sources for the right eye
37, 39 . . . light sources for the left eye
41 . . . upper light shielding member
43 . . . lower light shielding member
63 . . . controller
65 . . . image signal output unit
67 . . . light source control unit
75 . . . polarizing plate
77 . . . transparent plate
79 . . . optical adhesive

BEST MODE FOR CARRYING OUT THE INVENTION

One embodiment of this invention will be described hereinafter with reference to the drawings.

In the following description, a "stereoscopic image display apparatus" will be described as an example of image display apparatus.

Figure 2:
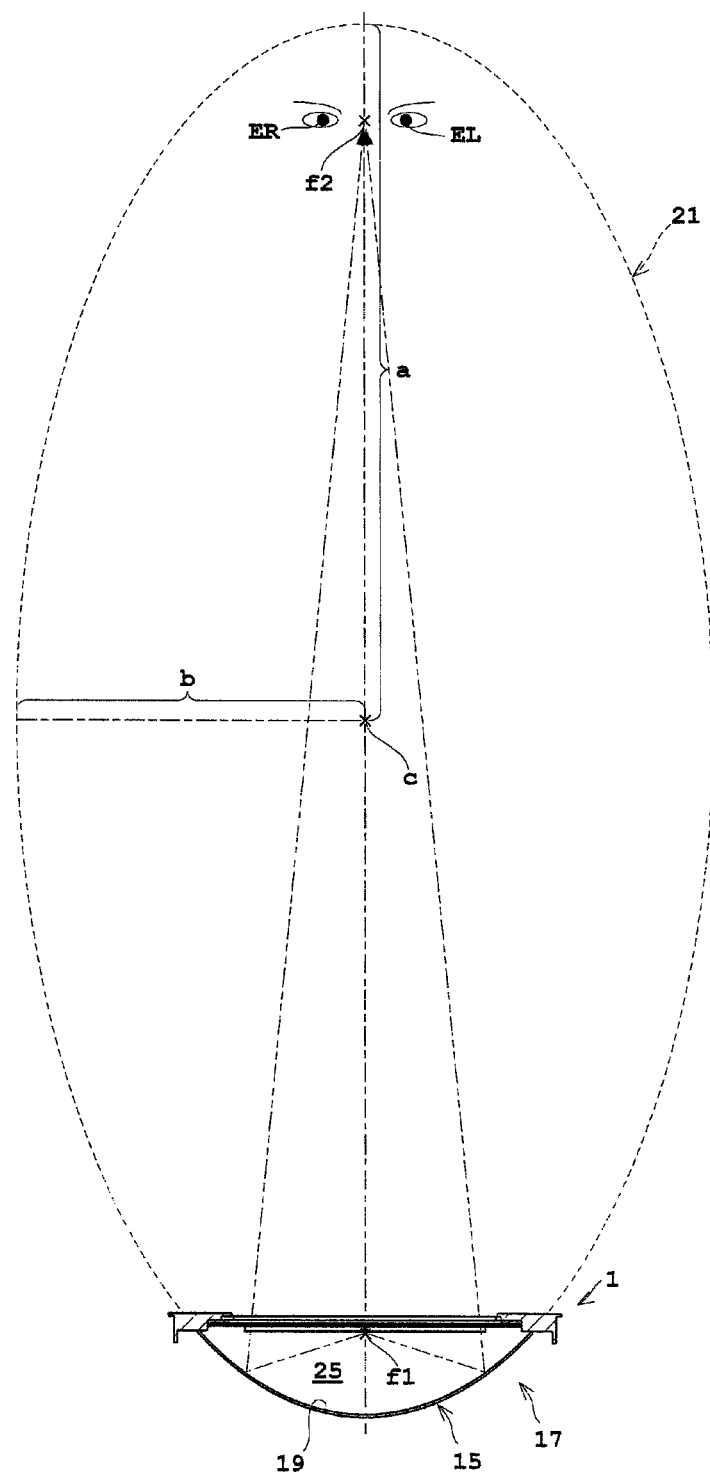
FIG. 2 is a schematic view illustrating an ellipse forming an elliptical mirror.
Figure 3:
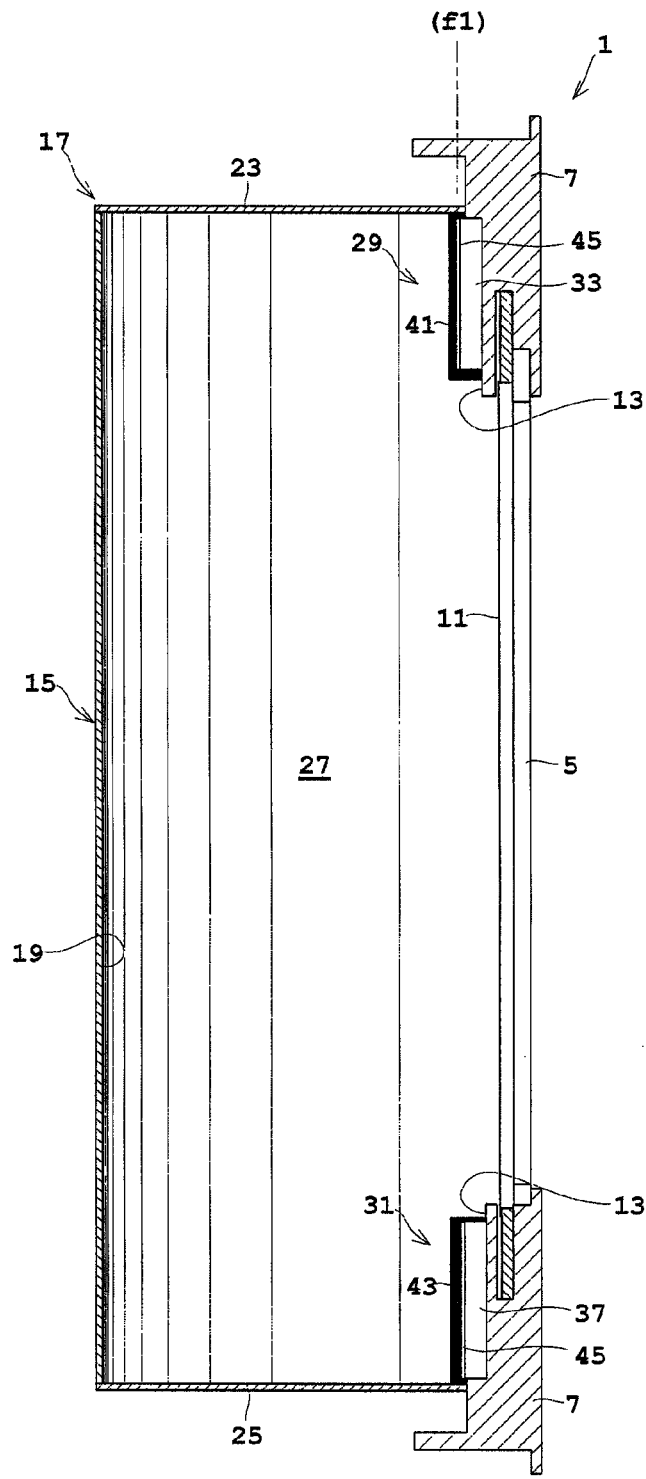
FIG. 3 is a view in vertical section showing an outline construction of the stereoscopic image display apparatus according to the embodiment.
Figure 4:
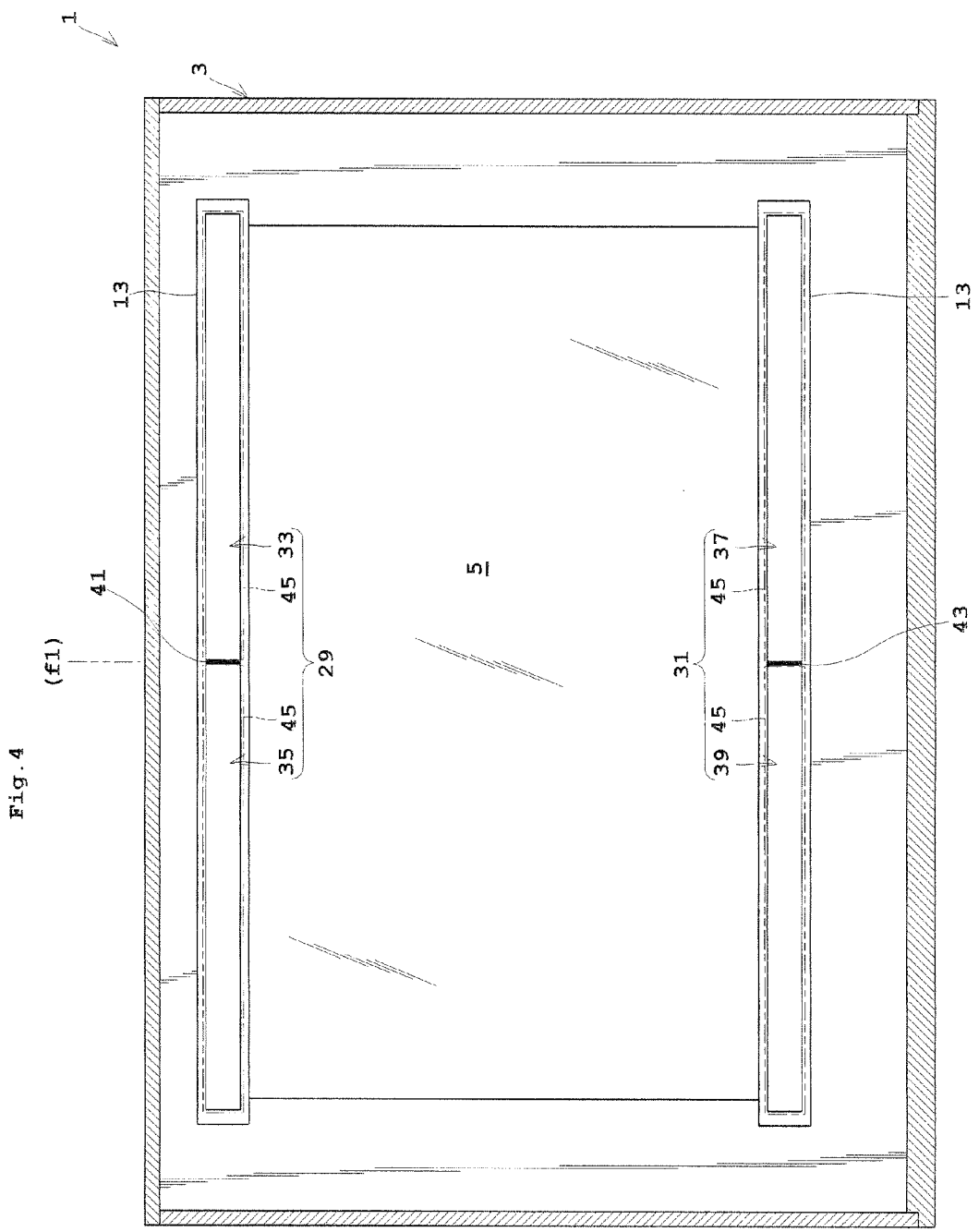
FIG. 4 is a view, seen from the elliptical mirror, of the stereoscopic image display apparatus according to the embodiment.

FIG. 1 is a cross section showing an outline construction of a stereoscopic image display apparatus according to the embodiment. FIG. 2 is a schematic view illustrating an ellipse forming an elliptical mirror. FIG. 3 is a view in vertical section showing an outline construction of the stereoscopic image display apparatus according to the embodiment. FIG. 4 is a view, seen from the elliptical mirror, of the stereoscopic image display apparatus according to the embodiment. In FIGS. 2 and 3, illustration of a housing is omitted for convenience of description.

A stereoscopic image display apparatus 1 according to this embodiment has a housing 3 whose cross section assumes a shape of character U. On a front plane of this housing 3, a transmission type liquid crystal display panel 5 is mounted through a support frame 7 including a front bezel. To the back side of the transmission type liquid crystal display panel 5, a diffusing member 11 is attached through spacers 9. This diffusing member 11 has a function to diffuse light in the vertical direction (the direction of the plane of FIG. 1). Mounting frames 13 are attached, respectively, to upper and lower portions of the support frame 7 located on the back side of the spacers 9.

With the above diffusing member 11 provided, boundary lines and the like in the lateral direction which exist adjacent junctions between an elliptical mirror 15 and a top reflector plate 23 and between the elliptical mirror 15 and a bottom reflector plate 25 to be described hereinafter can be inhibited from appearing on the transmission type liquid crystal display panel 5.

A reflection unit 17 having the elliptical mirror 15 is mounted rearward (downward in FIG. 1) of the mounting frames 13. The elliptical mirror 15 has a concave surface acting as a reflecting surface 19. Reference is made to FIG. 2 for this elliptical mirror 15.

The elliptical mirror 15 corresponds to part of an arc of an ellipse 21. The ellipse 21 has a center c, a major axis a and a minor axis b. Since the major axis a and a center line are in agreement, the elliptical mirror 15 has a symmetrical shape across the center line. One focus f1 of the ellipse 21 is set to the side of the reflecting surface 19, in other words, is set adjacent a chord of the part of the ellipse 21 which forms the elliptical mirror 15. The other focus f2 of the ellipse 21 is set between the observer's right eye ER and left eye EL (adjacent the glabella).

The reflection unit 17 includes an upper reflector plate 23 disposed adjacent an upper edge of the elliptical mirror 15, and a lower reflector plate 25 disposed adjacent a lower edge of the elliptical mirror 15. Both the upper reflector plate 23 and lower reflector plate 25 assume a plate form covering an area from the reflecting surface 19 of the elliptical mirror 15 to a position corresponding to the chord of the part of the arc of the ellipse 21 of the elliptical mirror 15. The upper reflector plate 23 is omitted from FIGS. 1 and 2 for reasons of illustration. A light path space 27 enclosed by these is not filled with an optical material or the like, but is atmospheric.

Adjacent the one focus f1 of the reflection unit 17, an upper light source unit 29 is attached to the upper mounting frame 13, and a lower light source unit 31 is attached to the lower mounting frame 13. The upper light source unit 29 has a pair of light sources consisting of a light source 33 for the right eye and a light source 35 for the left eye arranged opposite across the one focus f1 in plan view. The lower light source unit 31 has a pair of light sources consisting of a light source 37 for the right eye and a light source 39 for the left eye arranged opposite across the one focus f1 in plan view. All the light sources, i.e. the light source 33 for the right eye, light source 35 for the left eye, light source 37 for the right eye and light source 39 for the left eye, are attached to the mounting frames 13 in positions capable of emitting light toward the reflecting surface 19. Specifically, the light sources 33, 35, 37 and 39 have light output planes thereof directed to the reflecting surface 19.

The upper light source unit 29 includes an upper light shielding member 41 mounted between the light source 33 for the right eye and the light source 35 for the left eye. Similarly, the lower light source unit 31 includes a lower light shielding member 43 mounted between the light source 37 for the right eye and the light source 39 for the left eye. The upper light shielding member 41 and lower light shielding member 43 are formed of members which block the passage of light. Each of the light sources 33, 35, 37 and 39 has a diffusing member 45 mounted on the light output plane thereof. This diffusing member 45, preferably, has a characteristic of diffusing light uniformly around.

With the above diffusing members 45, the light-emitting shapes of the upper light source unit 29 and lower light source unit 31 can be inhibited from appearing on the transmission type liquid crystal display panel 5.

The above light source 33 for the right eye corresponds to the "upper first light source" in this invention. The light source 35 for the left eye corresponds to the "upper second light source". The light source 37 for the right eye corresponds to the "lower first light source" in this invention. The light source 39 for the left eye corresponds to the "lower second light source" in this invention.

Example of Control System

Figure 5:
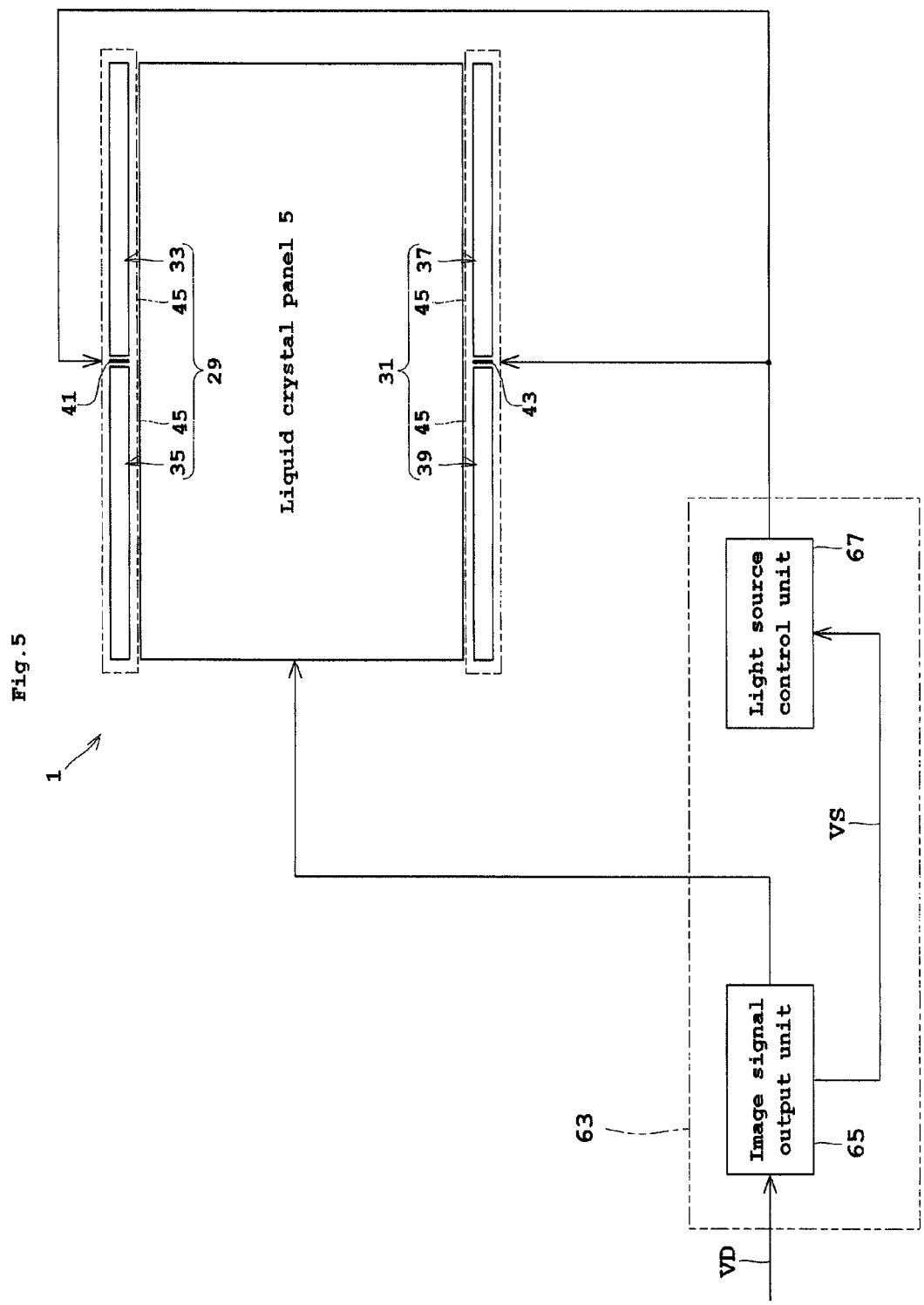
FIG. 5 is a block diagram relating to a control system of the stereoscopic image display apparatus.
Figure 6A:
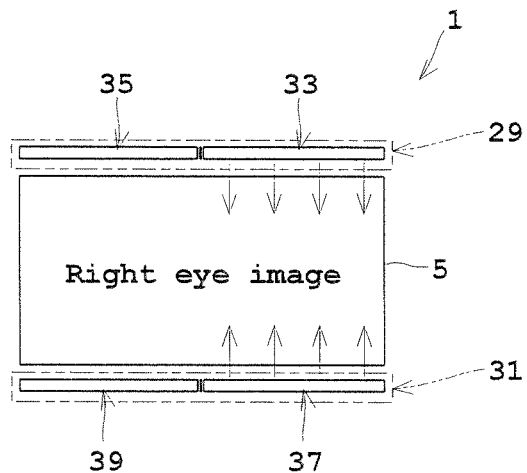
FIGS. 6 (a) and (b) are schematic views showing an example of control of light source units, seen from the back surface.
Figure 6B:
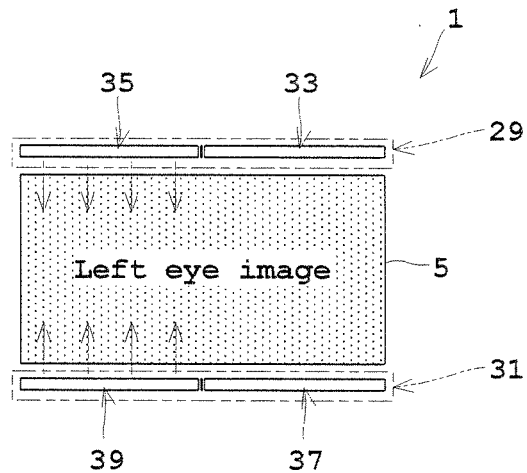

Next, reference is made to FIGS. 5 and 6. FIG. 5 is a block diagram relating to a control system of the stereoscopic image display apparatus. FIGS. 6 (*a*) and (*b*) are schematic views showing an example of control of light source units, seen from the back surface.

A controller 63 includes an image signal output unit 65 for receiving video signals VD and alternately outputting images for the right eye and images for the left eye, which have a binocular parallax, to the transmission type liquid crystal display panel 5, and a light source control unit 67 for controlling lighting of the upper light source unit 29 and lower light source unit 31 according to the images and in response to vertical synchronizing signals VS when the image signal output unit 65 successively switches the images for the right eye and the images for the left eye.

The image signal output unit 65 corresponds to the "image output device" in this invention. The light source control unit 67 corresponds to the "light source control device" in this invention. The images for the right eye correspond to the "first image" in this invention. The images for the left eye correspond to the "second image" in this invention.

When the image signal output unit 65 outputs the images for the right eye and the images for the left eye to the transmission type liquid crystal display panel 5, the light source control unit 67 switches and lights the light sources 33 and 37 for the right eye and light sources 35 and 39 for the left eye of the upper light source unit 29 and lower light source unit 31. Specifically, when an image for the right eye is displayed on the transmission type liquid crystal display panel 5, the light sources 33 and 37 for the right eye are lit as shown in FIG. 6 (*a*). When an image for the left eye is displayed, the light sources 35 and 39 for the left eye are lit as shown in FIG. 6 (*b*).

The transmission type liquid crystal display panel 5 is not rewritten in an instant from the image for the right eye to the image for the left eye, and at a certain point of time there occurs a state where the image for the right eye and the image for the left eye are mixed. For example, there occurs a state where the upper half is the image for the left eye, and the lower half is the image for the right eye. In such a case, the light source control unit 67 may control each light source such that, instead of switching the light sources 33 and 35 for the right eye and the light sources 37 and 39 for the left eye at once as noted above, the light source 37 for the right eye and the light source 35 for the left eye are switched on while the light source 33 for the right eye and the light source 39 for the left eye are switched off, then both the light sources 35 and 39 for the left eye are lit. Consequently, the stereoscopic image is prevented from becoming indistinct due to the image for the right eye and the image for the left eye being recognized by the observer at the same time.

According to this embodiment as described above, the width of the apparatus can be restrained since the upper light source unit 29 and lower light source unit 31 having a pair of light sources 33, 35, 37 and 39 are arranged between the reflection unit 17 having one of the focuses f1 to the side of the reflecting surface 19 and including the elliptical mirror 15, and the transmission type liquid crystal display panel 5. Moreover, the elliptical mirror 15 is the stationary type, and the reflecting surface 19 employed is shaped symmetrical in plan view, which allow the respective light sources to use the common elliptical mirror 15. Therefore, the stereoscopic image display apparatus realizes a reduction in size and a reduction in apparatus cost.

Since the two, upper light source unit 29 and lower light source unit 31 are provided as light sources, the luminance of images displayed on the transmission type liquid crystal display panel 5 can be increased. Further, with the upper light shielding member 41 and lower light shielding member 43, the light emitted from either one of the light source 33, 37 for the right eye and the light source 35, 39 for the left eye is inhibited from being emitted to the other one's side. Therefore, the image for the right eye and the image for the left eye can be clearly displayed on the transmission type liquid crystal display panel 5.

<First Modification>

Figure 7:
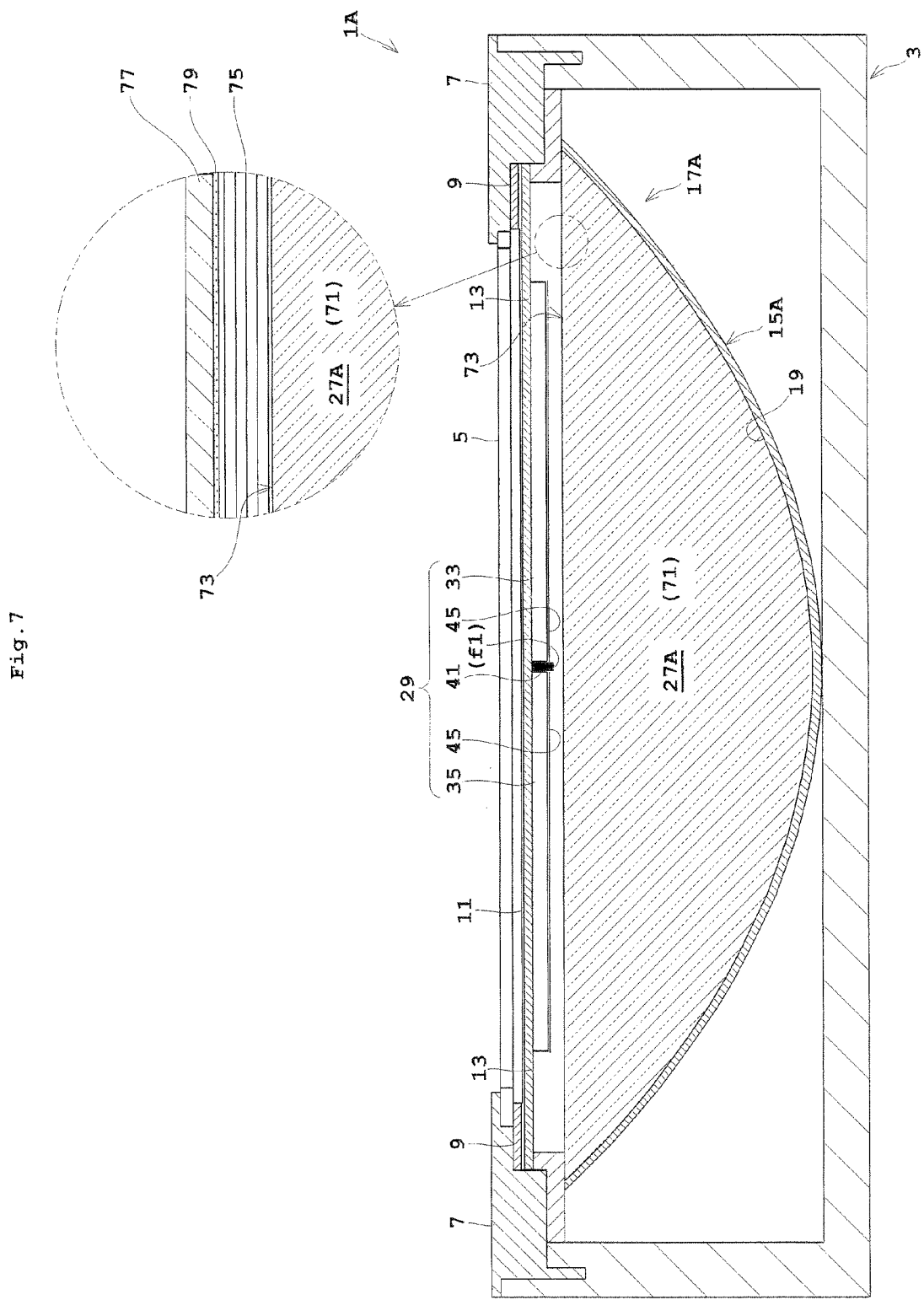
FIG. 7 is a cross section showing a first modification of the reflection unit.
Figure 8A:
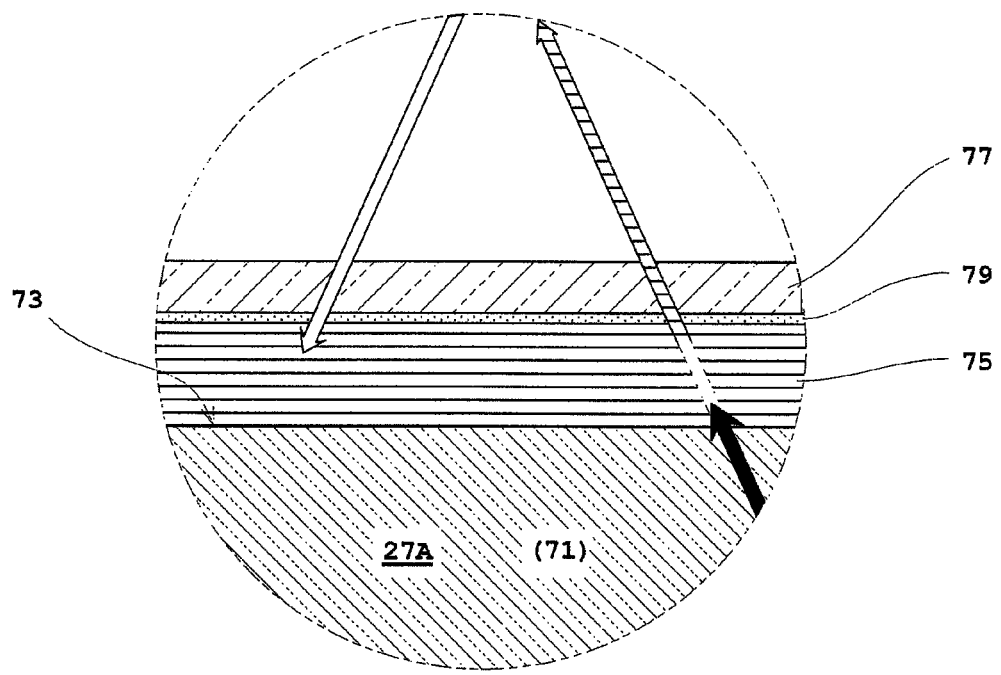
FIGS. 8 (a) and (b) are schematic views illustrating action of a polarizing plate in the first modification.
Figure 8B:
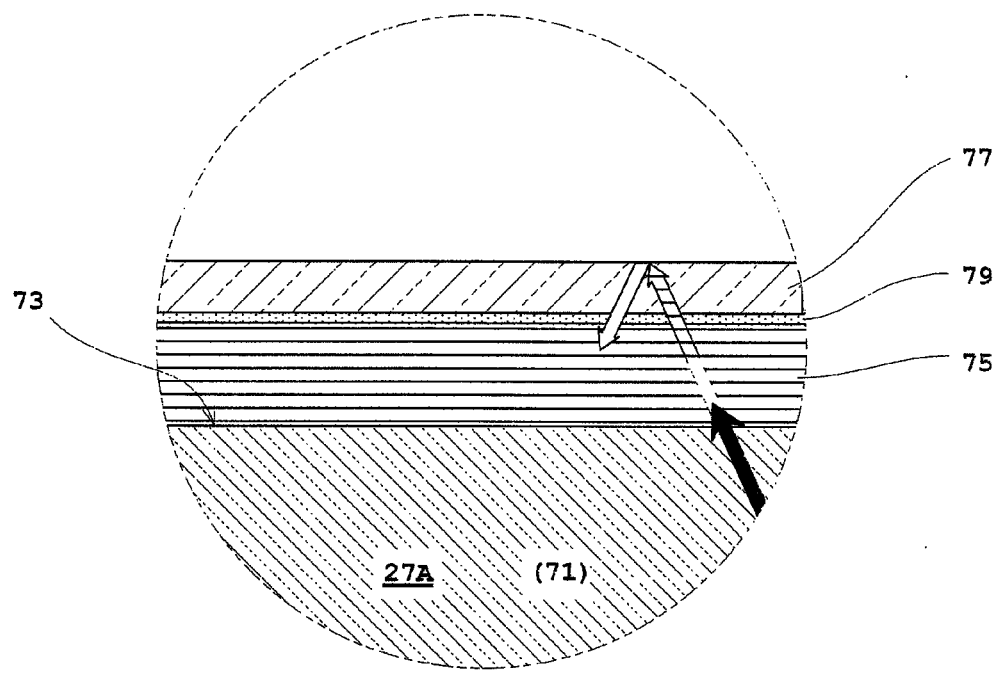

In the apparatus in the foregoing embodiment, the light path space 27 of the reflection unit 17 is not filled with a material but is filled with only air. When the reflection unit 17 is constructed as follows, for example, it is preferable to employ the following construction for the light output plane of the reflection unit 17. Reference is now made to FIGS. 7 and 8. FIG. 7 is a cross section showing a first modification of the reflection unit. FIGS. 8 (*a*) and (*b*) are schematic views illustrating action of a polarizing plate in the first modification.

In this stereoscopic image display apparatus 1A, a light path space 27A of an elliptical mirror 15A forming a reflection unit 17A is formed of a light guide 71. While the light guide 71 may be any material that transmits light, an acrylic resin is cited as an example. On a light output plane 73, a polarizing plate 75 and a transparent plate 77 are arranged in close contact as bonded with an optical adhesive 79. The polarizing plate 75, preferably, has a characteristic of linear polarization or circular polarization with a refractive index equivalent to that of the light guide 71. The transparent plate 77 does not have a polarization characteristic.

The above optical adhesive 79 is an adhesive consisting of a material excellent in optical transparency, and moreover, it is an adhesive with a refractive index which can be selected according to optical elements. While the above polarizing plate 75 and transparent plate 77 are provided, as laminated, on the light output plane 73, it is preferable that the polarizing plate 75 and transparent plate 77 are not provided in regions opposed to the upper light source unit 29 and lower light source unit 31, where the lights therefrom will fall (planes of incidence). By not providing them to the planes of incidence, incidence efficiency can be promoted.

Where the reflection unit 17A has the light guide 71 as described above, the reflecting surface 19 is out of contact with air, which can inhibit degradation of reflectance with the passage of time. On the other hand, part of the light reflected by the reflecting surface 19 and exiting from the light output plane 73 is reflected by the back surface of the transmission type liquid crystal display panel 5 to enter the light output plane 73 again, thereby producing an unintended reflection at the reflecting surface 19. There is a possibility that this causes an aggravation of crosstalk. Similarly, there occurs a phenomenon in which the light reflected by the reflecting surface 19 and traveling to the light output plane 73, depending on its incidence angle, does not exit from the light output plane 73 but reflects at the interface between the light output plane 73 and a layer of air, then travels to the reflecting surface 19 again. This may also produce the same problem as above.

However, with the polarizing plate 75 and transparent plate 77 provided as above, as shown in FIG. 8 (*a*), the light exiting from the light output plane 73 is placed in a different polarized state by the polarizing plate 75. Therefore, even if it is reflected at the back of the transmission type liquid crystal display panel 5, most part is absorbed or attenuated by the polarizing plate 75. Since the light traveling to the reflecting surface 19 again can be reduced, the problem noted above can be prevented. Since the polarizing plate 75 has a refractive index equivalent to that of the light guide 71, the light reflected at the light output plane 73, as shown in FIG. 8 (*b*), is transmitted through the polarizing plate 75 and reflects at the interface between the transparent plate 77 and the layer of air. Then, it is also placed in a different polarized state by the polarizing plate 75, thereby reducing the light traveling to the reflecting surface 19 again, similarly to the above. As a result, an aggravation of crosstalk can be inhibited.

<Second Modification>

In the apparatus in the foregoing embodiment and the first modification, the reflection unit 17 includes the ordinary elliptical mirror 15, 15A. The elliptical mirror may be constructed as follows. Reference is now made to FIG. 9. FIG. 9 is a cross section showing a second modification of the reflection unit.

An elliptical mirror 15B provided for a reflection unit 17B is different from the construction described above, in that it is a Fresnel type reflection mirror having numerous reflecting surfaces 19 (Fresnel type reflecting surfaces) which correspond to disintegrated parts of the reflecting surface 19 of the elliptical mirror 15 or 15A. Thus, with the one focus f1 and other focus f2, same as the elliptical mirror 15 or 15A, the elliptical mirror 15B having the Fresnel type reflecting surfaces 19 can shorten not only the width of the apparatus but the depth of the apparatus, thereby attaining a further reduction in size.

Where the elliptical mirror 15B consisting of this Fresnel reflection mirror is employed, it is preferable to provide side reflectors 81 on the side surfaces of the elliptical mirror 15B in order to prevent sideways leakage of light from a light path space 27B, thereby to promote use efficiency of the light.

<Third Modification>

Figure 10:
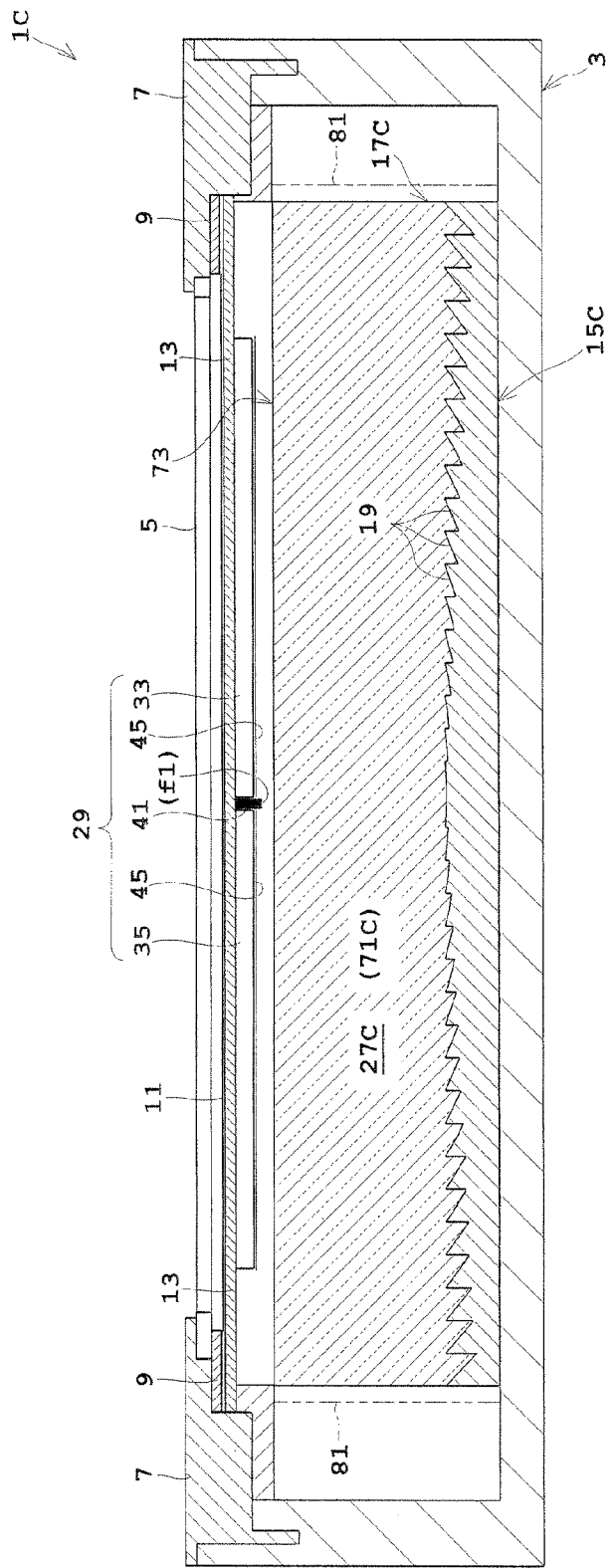
FIG. 10 is a cross section showing a third modification of the reflection unit.

The second modification may be constructed as shown in FIG. 10. FIG. 10 is a cross section showing a third modification of the reflection unit.

A stereoscopic image display apparatus 1C, same as in the first modification, includes a reflection mirror 15C with a light path space 27C formed of a light guide 71C, and this is used to form a reflection unit 17C. This can inhibit degradation, with the passage of time, of reflectance at the reflecting surfaces 19 of the reflection unit 17C, and can also shorten the depth of the apparatus.

For the reason described in the first modification, and same as in the first modification, it is preferable to arrange, on the light output plane 73, a polarizing plate 75 and a transparent plate 77 bonded with an optical adhesive 79.

<Fourth Modification>

Figure 11:
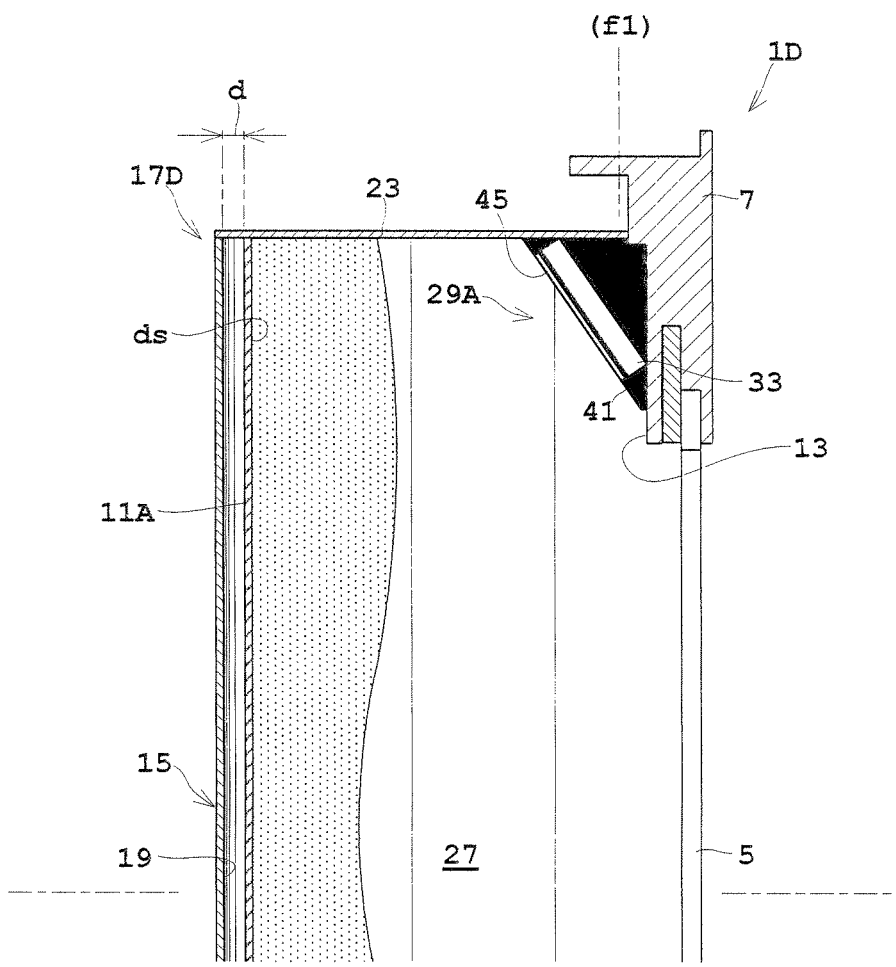
FIG. 11 is a fragmentary view in vertical section showing a fourth modification.
Figure 12:
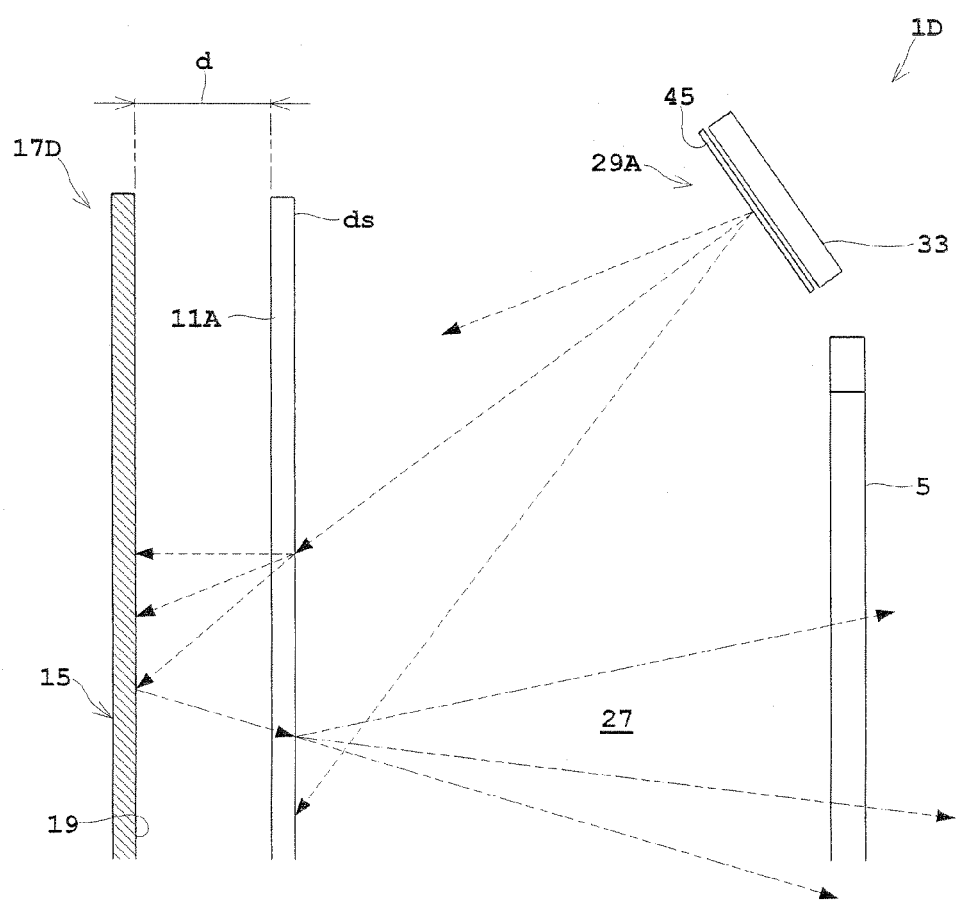
FIG. 12 is a view illustrating diffusion.

It is preferable to employ the following construction in the apparatus in the foregoing embodiment. Reference is now made to FIGS. 11 and 12. FIG. 11 is a fragmentary view in vertical section showing a fourth modification. FIG. 12 is a view illustrating diffusion.

A stereoscopic image display apparatus 1D in this fourth modification is different from the foregoing stereoscopic image display apparatus 1 in the construction of an upper light source unit 29A and a reflection unit 17D. Although not shown in the drawings, the lower light source unit 31, preferably, is constructed as a lower light source unit 31A same as in the case of the upper light source unit 29A, as described hereinafter. The upper light source unit 29A is disposed in a tilted position directed toward a middle part (chain lines in the drawing) in the height direction of the reflecting surface 19 of the elliptical mirror 15. More particularly, the upper light source unit 29A has a light output plane thereof directed toward the middle part in the height direction of the reflecting surface 19. However, it is not so strict that its optical axis should be in agreement with the middle part in the height direction of the reflecting surface 19. Instead of being directed horizontally as in the foregoing embodiment, the optical axis may be directed closer to the middle part than the upper end in the height direction of the reflecting surface 19.

With the construction in the foregoing embodiment, part of the light traveling upward, of the light emitted from the upper light source unit 29 does not contribute to formation of images, which is disadvantageous from the viewpoint of use efficiency of light. However, with the construction in this fourth modification, the luminance of images can be increased since the light emitted from the upper light source unit 29A can be directed to the reflecting surface 19 of the elliptical mirror 15 efficiently.

The stereoscopic image display apparatus 1D does not include the diffusing member (11) on the back side of the transmission type liquid crystal display panel 5, but includes a diffusing member 11A along the reflecting surface 19 of the elliptical mirror 15. This diffusing member 11A is attached as spaced a predetermined distance d from the reflecting surface 19. The diffusing member 11A has a diffusing surface ds on one surface, and the diffusing surface ds faces the back side of the transmission type liquid crystal display panel 5 which is the opposite side to the reflecting surface 19. The diffusing member 11A may, for example, have nano irregularities of micro lenses formed on the one surface only.

With the above construction, as shown in FIG. 12, after being diffused by the diffusing member 11A, the light from the upper light source unit 29A is reflected by the reflecting surface 19 of the elliptical mirror 15 and then is diffused again by the diffusing member 11A to travel to the transmission type liquid crystal display panel 5. Therefore, since diffusion can be produced efficiently, portions with different reflectances which may be produced in the lateral direction adjacent the upper and lower ends of the elliptical mirror 15 can be further inhibited from being displayed on the transmission type liquid crystal display panel 5. Since the diffusing member 11A is disposed in the position spaced the predetermined distance d from the reflecting surface 19, the predetermined interval d can be secured as diffusion distance, and sufficient diffusion can be made during the time after the light transmits through the diffusing member 11A until it arrives at the reflecting surface 19.

The diffusing member 11A is attached in the position to have the diffusing surface ds facing away from the reflecting surface 19. In other words, the diffusing member 11A has the diffusing surface ds facing the upper light source unit 29A. This can reduce the rate at which the light from the upper light source unit 29A undergoes surface reflection, thereby to improve use efficiency of the light. Even if the light from the upper light source unit 29A is reflected on the surface, the reflected light is diffused or attenuated over a wide range, hence adverse influence of surface reflection is little.

<Fifth Modification>

Figure 13:
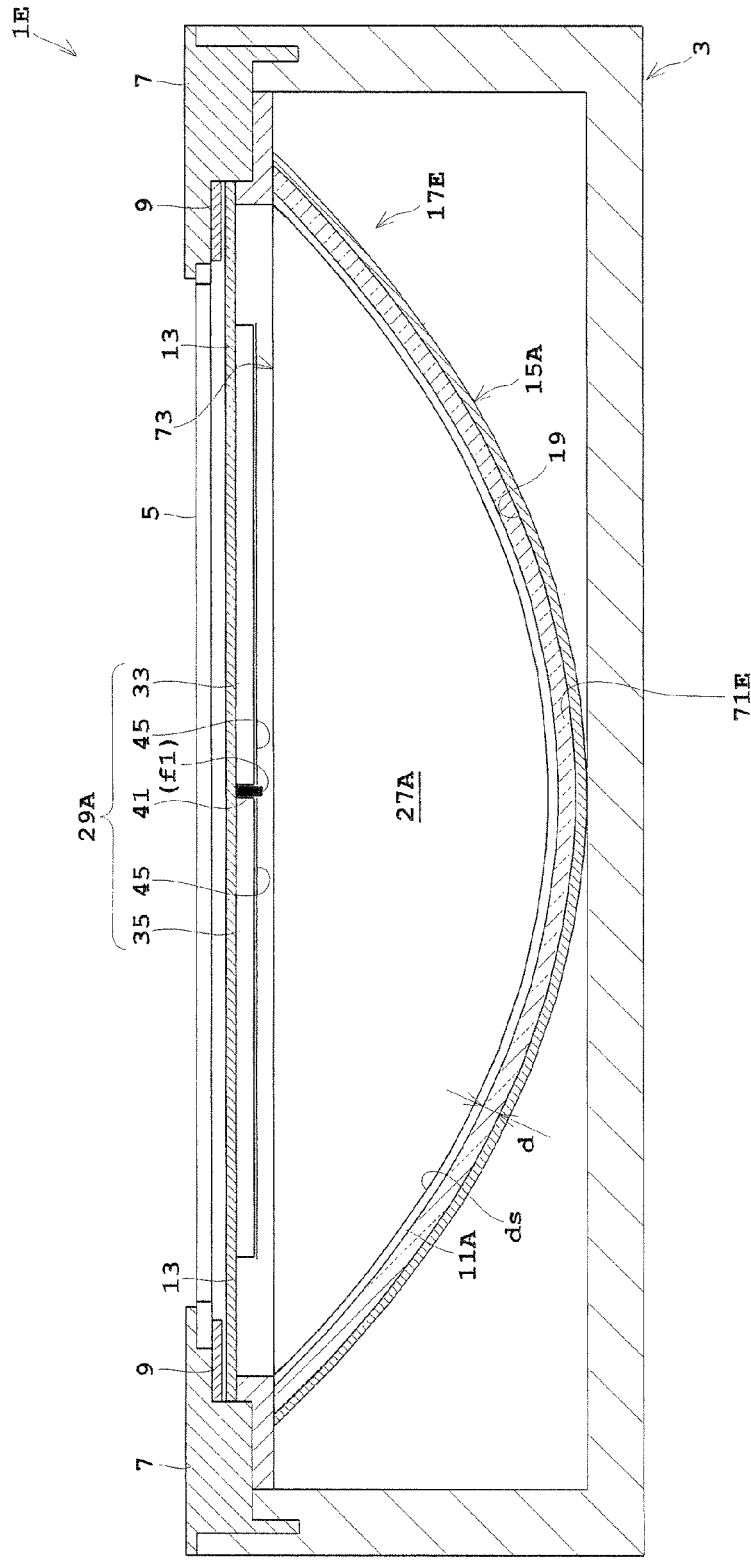
FIG. 13 is a cross section showing a fifth modification.

In the first modification described hereinbefore, it is preferable to construct as follows. Reference is now made to FIG. 13. FIG. 13 is a cross section showing a fifth modification.

A stereoscopic image display apparatus 1E in this fifth modification is different from the stereoscopic image display apparatus 1A in the embodiment in the constructions of upper light source unit 29A and reflection unit 17E. The upper light source unit 29A has the same construction as in the fourth modification described above. The reflection unit 17E includes a diffusing member 11A disposed along the reflecting surface 19 of the reflection mirror 15A, and spaced a predetermined distance d therefrom. A light guide 71E is filled between the diffusing member 11A and the reflecting surface 19. The light path space 27A from the diffusing member 11A to the back side of the transmission type liquid crystal display panel 5 is filled with nothing, but is atmospheric. Where a light guide is present between the diffusing member 11A and the transmission type liquid crystal display panel 5, and if the light guide and diffusing member 11A have an equal refractive index, there is a possibility that the diffusing action of the diffusing member 11A will lower. However, there can be no lowering of the diffusing action since the light guide 71E is provided only between the reflecting surface 19 and the diffusing member 11A.

Such construction provides the same effect as the fourth modification in addition to the effect of the first modification described hereinbefore. Moreover, since the light guide 71E has a small capacity, a weight saving can be attained.

<Sixth Modification>

Figure 14:
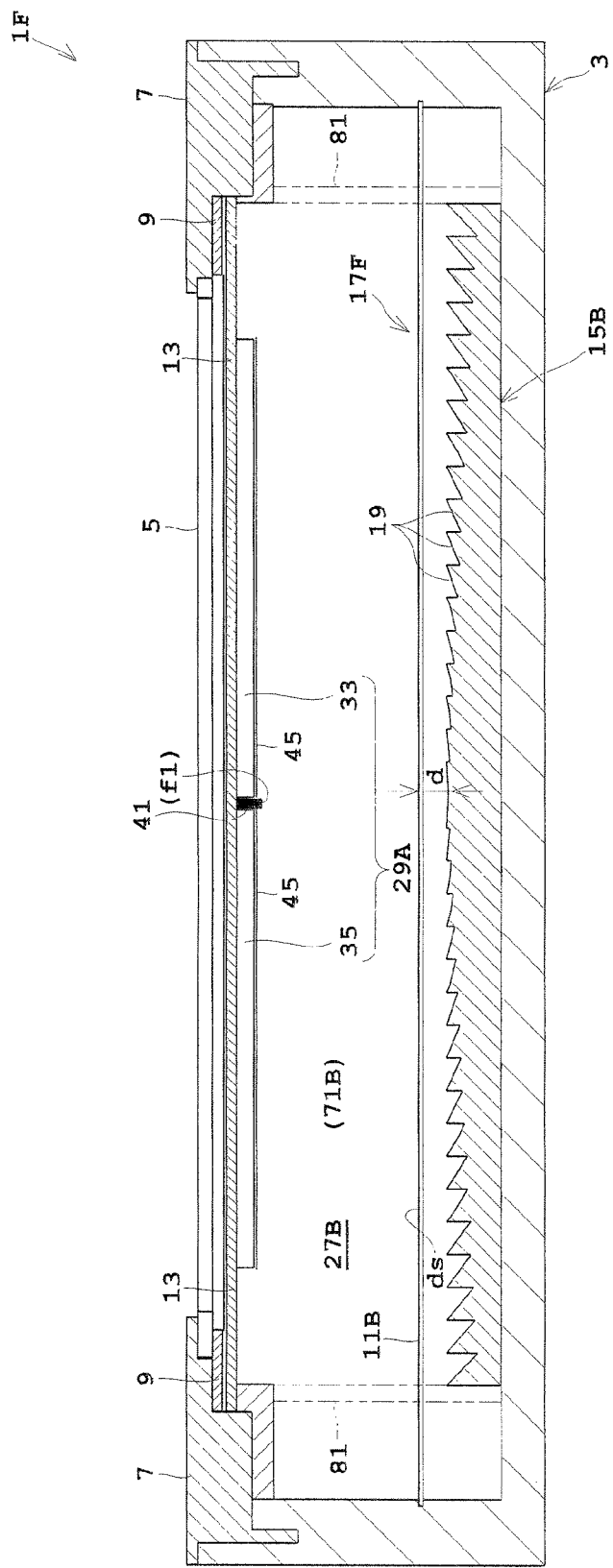
FIG. 14 is a cross section showing a sixth modification.

It is preferable to construct the second modification described hereinbefore, as shown in FIG. 14. FIG. 14 is a cross section showing a sixth modification.

A stereoscopic image display apparatus 1F in this sixth modification is different from the stereoscopic image display apparatus 1B in the constructions of upper light source unit 29A and reflection unit 17F. The upper light source unit 29A has the same construction as in the fourth modification described above. The reflection unit 17F includes a diffusing member 11B disposed in a position spaced a predetermined distance d from a central part of the Fresnel type elliptical mirror 15B. The diffusing surface ds faces the back side of the transmission type liquid crystal display panel 5 same as in the above fourth modification. The diffusing member 11B has a shape of flat plate, but may be shaped to follow the Fresnel type reflecting surfaces 19 of the elliptical mirror 15B.

Such construction provides the same effect as the fourth modification in addition to the effect of the second modification described hereinbefore.

<Seventh Modification>

It is preferable to construct the third modification described hereinbefore, as shown in FIG. 15. FIG. 15 is a cross section showing a seventh modification.

A stereoscopic image display apparatus 1G in this seventh modification is different from the stereoscopic image display apparatus 1C in the constructions of upper light source unit 29A and reflection unit 17G. The upper light source unit 29A is the same as in the above fourth modification. The reflection unit 17G has a construction in which a light guide 71C is provided for the reflection unit 17F in the sixth modification described above. More particularly, a light guide 71G is filled between the diffusing member 11B and the reflecting surfaces 19. A light path space 27C from the diffusing member 11A to the back side of the transmission type liquid crystal display panel 5 is atmospheric. Where a light guide is present between the diffusing member 11B and the transmission type liquid crystal display panel 5, and if the light guide and diffusing member 11A have an equal refractive index, there is a possibility that the diffusing action of the diffusing member 11B will lower. However, there can be no lowering of the diffusing action since the light guide 71G is provided only between the reflecting surfaces 19 and the diffusing member 11B.

Such construction provides the same effect as the fourth modification in addition to the effect of the third modification described hereinbefore. Moreover, since the light guide 71G has a small capacity, a weight saving can be attained.

This invention is not limited to the foregoing embodiments, but may be modified as follows.

(1) In each of the foregoing embodiment and modifications, the light source unit 17 includes the upper light source unit 29 (29A) and lower light source unit 31 (31A). Instead, only the upper light source unit 29 (29A) may be provided. This can display images while keeping down power consumption. A construction having only the lower light source unit 31 (31A) produces the same effect.

(2) In each of the foregoing embodiment and modifications, the image for the right eye and the image for the left eye with binocular parallax are noted as the first image and the second image. The first image and the second image may be completely different images, for example. This realizes what is called a "dual-view" image display apparatus with which, in the range on the right side of the observer including the position of the observer's right eye ER noted hereinbefore, and in the range on the left side of the observer including the position of the observer's left eye EL, a plurality of different observers can observe different images, respectively, at the same time.

(3) In each of the foregoing embodiment and modifications, the diffusing member 11 (11A, 11B) is provided at the back of the transmission type liquid crystal display panel 5. Where, for example, boundary lines in the lateral direction which exist adjacent the junctions between the elliptical minor 15, top reflector plate 23 and bottom reflector plate 25 have no influence on the transmission type liquid crystal display panel 5, the diffusing member 11 (11A, 11B) need not be provided.

(4) In each of the foregoing embodiment and modifications, the upper light source unit 29 (29A) and lower light source unit 31 (31A) have the diffusing members 45, respectively. Where the emission shapes of the upper light source unit 29 (29A) and lower light source unit 31 (31A) have no influence on the transmission type liquid crystal display panel 5, the diffusing members 45 need not be provided.

(5) In each of the foregoing embodiment and modifications, the elliptical mirror 15 (15A-15C) is constructed integral. Instead, a plurality of elliptical mirrors 15 (15A-15C) may be combined into one elliptical mirror 15 (15A-15C). For example, the elliptical mirror 15 may be constructed by combining, in the height direction, the plurality of belt-like elliptical mirror pieces 15 (15A-15C) which are divided horizontally. Or the elliptical mirror 15 (15A-15C) may be constructed by connecting, in the horizontal direction, mirror pieces of different curvatures which are divided vertically and which form parts of an arc of an ellipse. The elliptical mirror 15 (15A-15C) may be constructed by combining these two ways. With such a construction, even when part of the elliptical mirror 15 (15A-15C) is broken or fogged, it is not necessary to change the entire elliptical mirror 15 (15A-15C), but it is sufficient to change only the part of the elliptical mirror 15 (15A-15C), which provides the effect of excellent maintainability.

(6) In the fifth modification and seventh modification described hereinbefore, the light guide 71E, 71G is provided between the reflecting surface 19 and the diffusing member 11A, 11B. Instead of such construction, the elliptical mirror 15A, 15C may be a mirror of the type having a reflecting surface 19 at the back side (back surface mirror), and the surface of a light transmission member located on the incidence plane of the mirror may be processed similarly to the diffusing member 11A, 11B, or the diffusing member 11A, 11B may be placed closely to the surface of the light transmission member. With such a construction, the reflecting surface 19 and diffusing member 11A, 11B are provided on the front and back surfaces of the single light transmission member. This is free from refraction loss, and can also protect the reflecting surface 19.

(7) In each of the foregoing embodiment and modifications, the transmission type liquid crystal display panel 5 is given as an example of transmission type display panels. This invention is not limited to the liquid crystal display type; this invention is applicable to any transmission type display panel. Transmission type MEMS (microelectro mechanical systems) may be cited for example.

INDUSTRIAL UTILITY

As described above, this invention is suitable for an image display apparatus for displaying images.

The invention claimed is:

1. An image display apparatus for displaying images, comprising:
a transmission type display panel for displaying the images;
a reflection unit disposed at a back side of the transmission type display panel, and including an elliptical mirror which corresponds to part of an arc of an ellipse and has a reflecting surface shaped symmetrical across a center line in plan view, one focus of the ellipse being set between the back side of the transmission type display panel and the reflecting surface, and the other focus of the ellipse being set between both eyes of an observer; and
a light source unit including a pair of light sources arranged adjacent the one focus of the reflection unit, attached adjacent the back side of the transmission type display panel in a position to emit light to the reflecting surface, opposed to each other across the one focus of the reflection unit in plan view, and arranged between the part of the arc of the ellipse and the display panel;
wherein the light source unit includes a lower light source unit having the pair of light sources, the pair of light sources being a lower first light source and a lower second light source attached to a lower portion of the transmission type display panel; and
wherein the apparatus further comprises:
an image output device for alternately outputting a first image and a second image to the transmission type display panel; and
a light source control device for switching on the lower first light source when the first image is outputted, and switching on the lower second light source when the second image is outputted.

2. The image display apparatus according to claim 1, wherein:
the light source unit further includes an upper light source unit including a pair of light sources arranged adjacent the one focus of the reflection unit, attached adjacent the back side of the transmission type display panel in a position to emit light to the reflecting surface, opposed to each other across the one focus of the reflection unit in plan view, and arranged between the part of the arc of the ellipse and the display panel, the pair of light sources being an upper first light source and an upper second light source attached to an upper portion of the transmission type display panel;
and
the light source control device further switches on the upper First light source when the first image is outputted, and further switches on the upper second light source when the second image is outputted.

3. The image display apparatus according to claim 2, wherein:
the first image is an image for the right eye, and the second image is an image for the left eye, a binocular parallax being provided for the image for the right eye and the image for the left eye; and
the upper first light source is disposed on a left side of the transmission type display panel as seen from the observer, and the upper second light source is disposed on a right side of the transmission type display panel as seen from the observer.

4. The image display apparatus according to claim wherein the transmission typo display panel includes a diffusing member attached to the back side thereof for vertically diffusing light.

5. The image display apparatus according to claim 1, wherein the light source unit includes a diffusing member mounted on a light output plane thereof for diffusing light.

6. The image display apparatus according to claim 1, wherein the reflection unit includes a light guide forming a light passage space from the reflecting surface to a position corresponding to a chord of the arc.

7. The image display apparatus according to claim 1, wherein:
the first image is an image for the right eye, and the second image is an image for the left eye, a binocular parallax being provided for the image for the right eye and the image for the left eye; and
the lower first light source is disposed on a left side of the transmission type display panel as seen from the observer, and the lower second light source is disposed on a right side of the transmission type display panel as seen from the observer.

8. The image display apparatus according to claim 1, wherein the reflection unit includes a diffusing member adjacent the reflecting surface for vertically diffusing light.

9. The image display apparatus according to claim 1, wherein the reflection unit includes a diffusing member adjacent the reflecting surface for vertically diffusing light, and a light guide disposed between the reflecting surface and the diffusing member.

10. An image display apparatus for displaying images, comprising:

a transmission type display panel for displaying the image;

a reflection unit disposed at a back side of the transmission type display panel, and including an elliptical mirror which corresponds to part of an arc of an ellipse and has Fresnel type reflecting surfaces shaped symmetrical across a center line in plan view, one focus of the ellipse being set between the back side of the transmission type display panel and the Fresnel type reflecting surfaces, and the other focus of the ellipse being set between both eyes of an observer; and a light source unit including a pair of light sources arranged adjacent the one focus of the reflection unit, attached adjacent the back side of die transmission type display panel in a position to emit light to the Fresnel type reflecting surfaces, opposed to each other across the one focus of the reflection unit in plan view, and arranged between the part of the arc of the ellipse and the display panel;

wherein the light source unit includes a lower light source unit having the pair of light sources, the pair of light sources being a lower first light source and a lower second light source attached to a lower portion of the transmission type display panel; and wherein the apparatus further comprises:

an image output device for alternately outputting a first image and a second image to the transmission type display panel; and a light source control device for switching on the lower first light source when the first image is outputted, and switching on the lower second light source when the second image is outputted.

11. The image display apparatus according to claim 10, wherein the reflection unit includes a light guide forming a light passage space from the Fresnel type reflecting surfaces to a position corresponding to a chord of the arc.

12. The image display apparatus according to claim 10, wherein the reflection unit includes a diffusing member adjacent the reflecting surface for vertically diffusing light, and a light guide disposed between the Fresnel type reflecting surfaces and the diffusing member.

13. The image display apparatus according to claim 10, wherein:

the light source unit further includes an upper light source unit including a pair of fight sources arranged adjacent the one locus of the reflection unit, attached adjacent the back side of the transmission type display panel in a position to emit light to the Fresnel type reflecting surfaces, opposed to each other across the one focus of the reflection unit in plan view, and arranged between the part of the arc of the ellipse and the display panel, the pair of light sources being an upper first light source and an upper second light source attached to an upper portion of the transmission type display panel;

and the light source control device further switches on the upper first light source when the first image is outputted, and further switches on the upper second light source when the second image is outputted.

14. The image display apparatus according to claim 13, wherein:

the first image is an image for the right eye, and the second image is an image for the left eye, a binocular parallax being provided for the image for the right eye and the image for the left eye; and the upper first light source is disposed on a left side of the transmission type display panel as seen from the observer, and the upper second light source is disposed on a right side of the transmission type display panel as seen from the observer.

15. The image display apparatus according to claim 10, wherein the transmission type display panel includes a diffusing member attached to the hack side thereof for vertically diffusing light.

16. The image display apparatus according to claim 10, wherein the light source unit includes a diffusing member mounted on a light output plane thereof for diffusing light.

17. The image display apparatus according to claim 10, wherein:

the first image is an image for the right eye, and the second image is an image for the left eve, a binocular parallax being provided for the image for the right eye and the image for the left eye; and the lower first light source is disposed on a left side of the transmission type display panel as seen from the observer, and the lower second light source is disposed on a right side of the transmission type display panel as seen from the observer.

18. The image display apparatus according to claim 10, wherein the reflection unit includes a diffusing member adjacent the reflecting sort for vertically diffusing light.

* * * * *